US012285985B2

(12) United States Patent
Kawasaki et al.

(10) Patent No.: US 12,285,985 B2
(45) Date of Patent: Apr. 29, 2025

(54) CONTROL APPARATUS

(71) Applicant: Hitachi Astemo, Ltd., Hitachinaka (JP)

(72) Inventors: Yoshifumi Kawasaki, Hitachinaka (JP);
Makoto Matsuura, Hitachinaka (JP);
Ryusuke Hirao, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 196 days.

(21) Appl. No.: 18/014,887

(22) PCT Filed: Jul. 14, 2021

(86) PCT No.: PCT/JP2021/026422
§ 371 (c)(1),
(2) Date: Jan. 6, 2023

(87) PCT Pub. No.: WO2022/024758
PCT Pub. Date: Feb. 3, 2022

(65) Prior Publication Data
US 2023/0249510 A1    Aug. 10, 2023

(30) Foreign Application Priority Data
Jul. 28, 2020   (JP) .................................. 2020-127319

(51) Int. Cl.
*B60G 17/0165*    (2006.01)
*B60G 17/016*    (2006.01)
*B60G 17/019*    (2006.01)

(52) U.S. Cl.
CPC ..... *B60G 17/0164* (2013.01); *B60G 17/0165* (2013.01); *B60G 17/01908* (2013.01)

(58) Field of Classification Search
CPC ............ B60G 17/0164; B60G 17/0165; B60G 17/019; B60G 17/01908
(Continued)

(56) References Cited

U.S. PATENT DOCUMENTS

| 2010/0138108 A1 | 6/2010 | Kajino | |
| 2022/0097473 A1* | 3/2022 | Kasuya | B60G 17/0182 |
| 2022/0126642 A1* | 4/2022 | Furuta | G01C 21/30 |

FOREIGN PATENT DOCUMENTS

| JP | 4-342612 | 11/1992 |
| JP | 5-319068 | 12/1993 |

(Continued)

OTHER PUBLICATIONS

International Search Report issued Sep. 21, 2021 in corresponding International Application No. PCT/JP2021/026422, with English language translation.

(Continued)

*Primary Examiner* — Erick R Solis
(74) *Attorney, Agent, or Firm* — Wenderoth, Lind & Ponack, L.L.P.

(57) ABSTRACT

A controller as a control apparatus controls a shock absorber of a control target wheel (a rear wheel) located in back of a detection target portion (a front wheel) of an unsprung acceleration sensor based on a detection value detected by the unsprung acceleration sensor on the front wheel side provided on a vehicle. In this case, the controller identifies a movement distance (a delay distance) from the detection target portion (the front wheel) and controls the shock absorber of the control target wheel (the rear wheel) located in back thereof based on the detection value of the unsprung acceleration sensor and a vehicle speed for each control period.

6 Claims, 5 Drawing Sheets

(58) Field of Classification Search
USPC .................................................. 701/37, 38
See application file for complete search history.

(56) References Cited

FOREIGN PATENT DOCUMENTS

| | | |
|---|---|---|
| JP | 9-136522 | 5/1997 |
| JP | 2009-119947 | 6/2009 |
| JP | 2011-183919 | 9/2011 |

OTHER PUBLICATIONS

International Preliminary Report on Patentability issued Jan. 31, 2023 in corresponding International Application No. PCT/JP2021/026422, with English language translation.

\* cited by examiner

CONTROL APPARATUS

TECHNICAL FIELD

The present disclosure relates to a control apparatus mounted on a vehicle such as an automobile and configured to control a force generation mechanism such as a damping three adjustable shock absorber.

BACKGROUND ART

For example, PTLs 1 to 4 discuss techniques for controlling a shock absorber located in back of a detection position using detection data such as a road surface situation and a vehicle behavior amount.

CITATION LIST

Patent Literature

PTL 1: Japanese Patent Application Public Disclosure No. H4-342612
PTL 2: Japanese Patent Application Public Disclosure No. 119-136522
PTL 3: Japanese Patent Application Public Disclosure No. 2009-119947
PTL 4: Japanese Patent Application Public Disclosure No. 2011-181919

SUMMARY OF INVENTION

Technical Problem

According to the above-described techniques disclosed in PTLs 1 to 4, the accuracy of the estimated value may be deteriorated and the ride comfort may be reduced when the vehicle runs at a low speed. Further, when the vehicle speed changes, the control may fail to keep up with it and end up reducing the ride comfort.

One object of one aspect of the present invention is to provide a control apparatus capable of improving ride comfort.

Solution to Problem

According to one aspect of the present invention, a control apparatus is configured to, based on a detection value detected by at least one vehicle behavior detection portion provided on a vehicle, control a force generation mechanism of a control target wheel located in hack of a detection target portion of the vehicle behavior detection portion. The control apparatus identifies a movement distance from the detection target portion and controls the force generation mechanism of the control target wheel located in back of the detection target portion based on the detection value and a vehicle speed for each control period.

According to the one aspect of the present invention, the ride comfort can be improved.

DESCRIPTION OF EMBODIMENTS

In the following description, control apparatuses according to embodiments will be described citing an example in which they are used in an automobile as a vehicle (more specifically, a four-wheeled automobile) with reference to the accompanying drawings.

Figure 1:
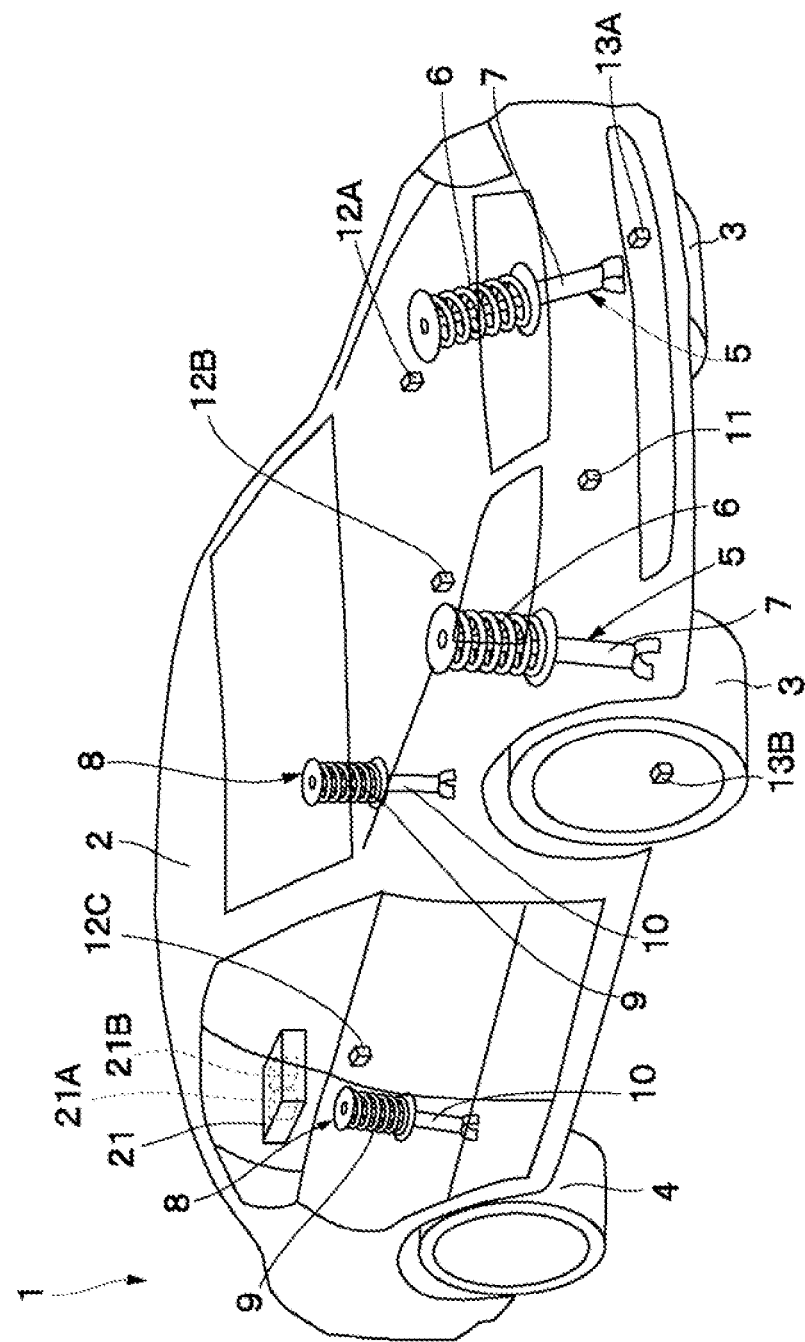
FIG. 1 is an overall configuration diagram illustrating a four-wheeled automobile on which a control apparatus according to a first embodiment is mounted.
Figure 2:
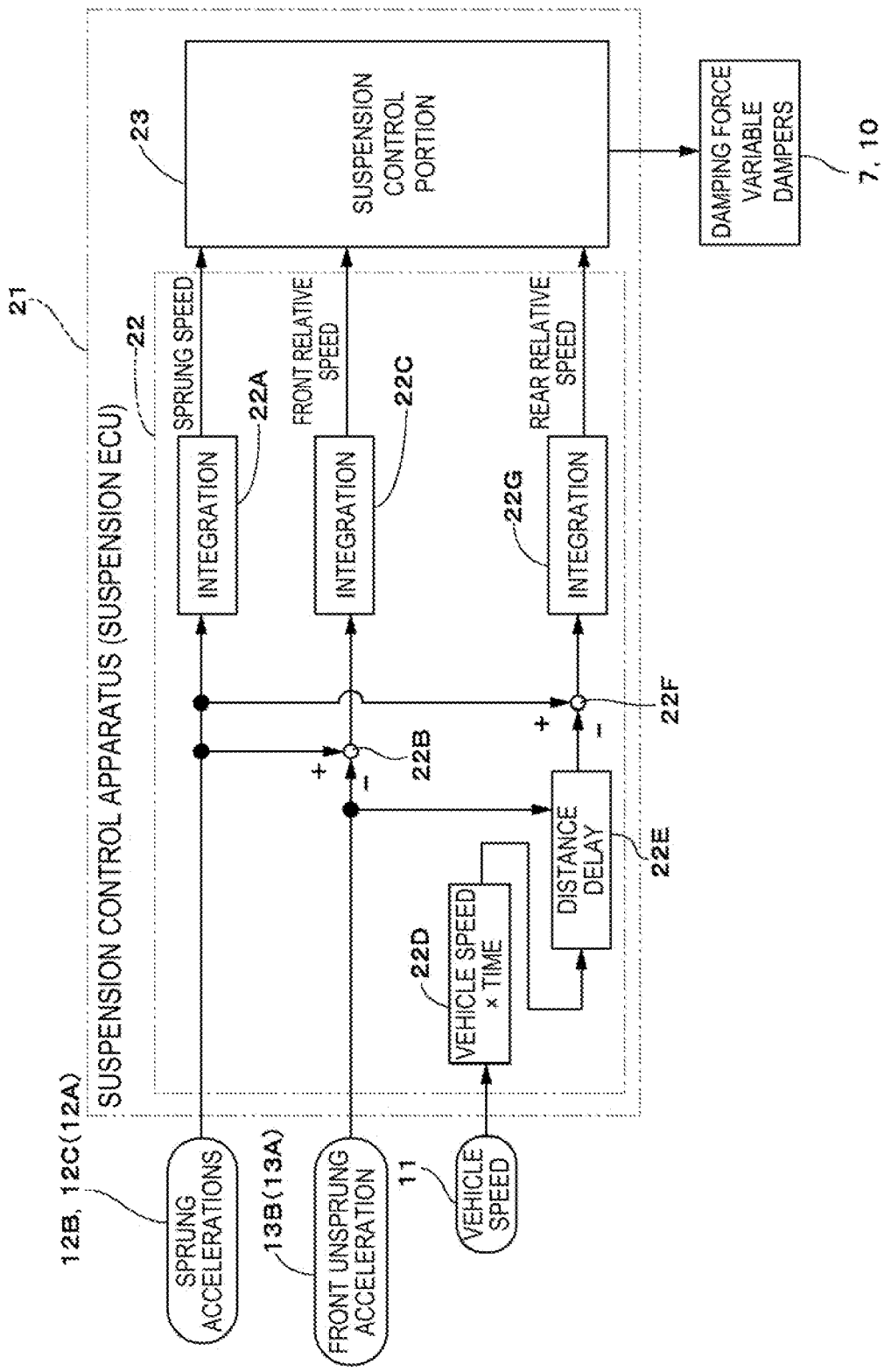
FIG. 2 is a block diagram illustrating the control apparatus (an ECU), force generation mechanisms (damping force variable dampers), and the like in FIG. 1.
Figure 3:
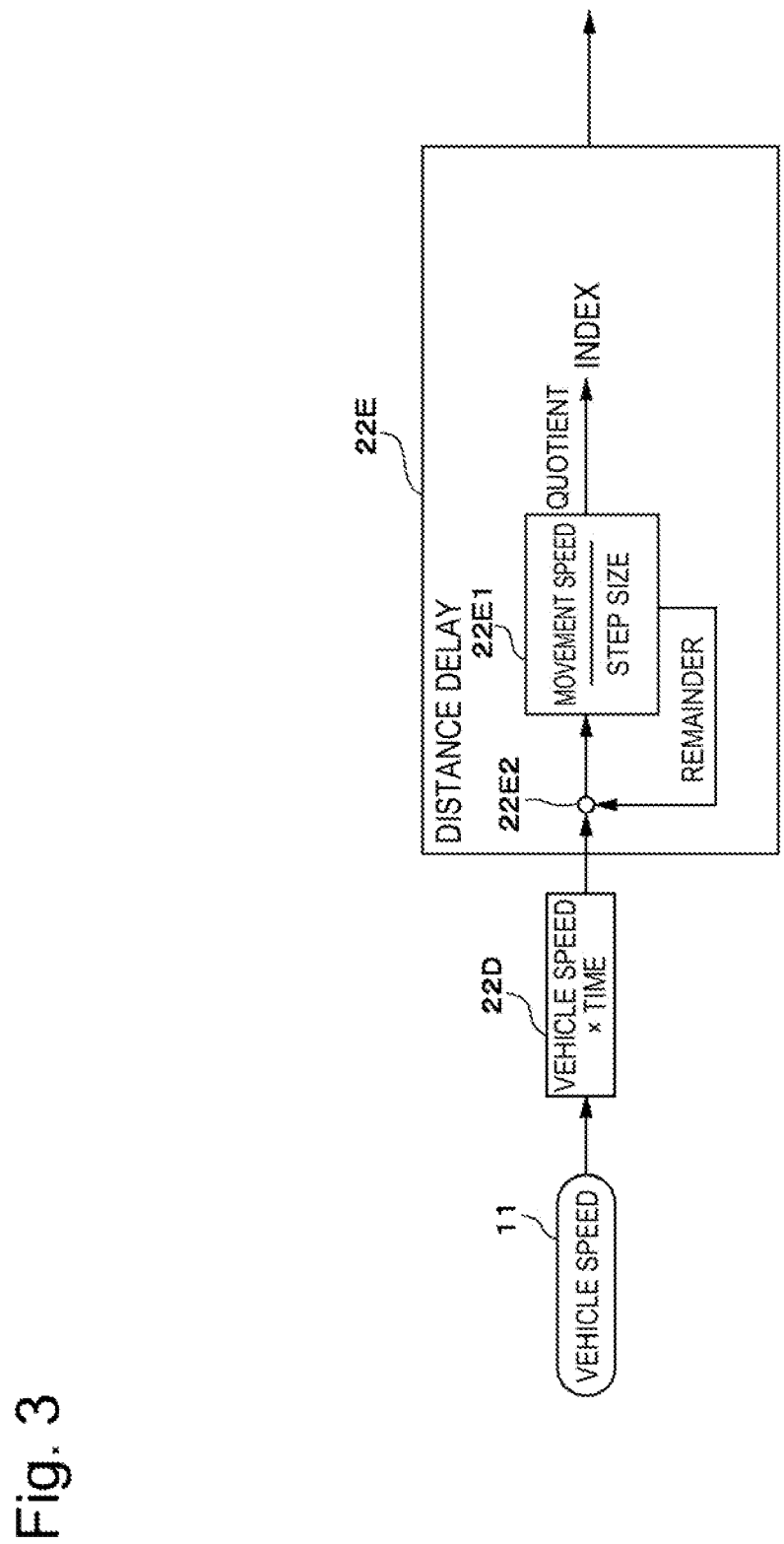
FIG. 3 is a block diagram illustrating error reduction processing.

FIGS. 1 to 3 illustrate a first embodiment. In FIG. 1, four wheels 3 and 4 in total that include, for example, left and right front wheels 3 and left and right rear wheels 4 (only one of them is illustrated) are provided under a vehicle body 2 forming a main structure of a vehicle 1, which is an automobile. Front wheel-side suspensions 5 and 5 (hereinafter referred to as front-wheel suspensions 5) are disposed so as to be interposed between the left and right front wheels 3 and the vehicle body 2, respectively. The front-wheel suspensions 5 each include a suspension spring 6 (hereinafter referred to as a spring 6) and a damping force adjustable shock absorber 7 (hereinafter referred to as a shock absorber 7) arranged in parallel with the spring 6.

Rear wheel-side suspensions 8 and 8 (hereinafter referred to as rear-wheel suspensions 8) are disposed so as to be interposed between the left and right rear wheels 4 and the vehicle body 2, respectively. The rear-wheel suspensions 8 each include a suspension spring 9 (hereinafter referred to as a spring 9) and a damping force adjustable shock absorber 10 (hereinafter referred to as a shock absorber 10) arranged in parallel with the spring 9. The shock absorbers 7 and 10 are each formed by, for example, a semi-active damper working as a hydraulic cylinder apparatus capable of adjusting a damping force (a damping force variable shock absorber). In other words, the vehicle 1 is equipped with a semi-active suspension system using the damping force variable shock absorber.

Now, the shock absorbers 7 and 10 are force generation mechanisms provided between the vehicle body 2 and the wheels 3 and 4 of the vehicle 1. More specifically, the shock absorbers 7 and 10 are damping force-variable damping force generation apparatuses (the damping force variable shock absorbers). The characteristics of the damping forces generated by the shock absorbers 7 and 10 (damping force characteristics) are variably controlled by a controller 21, which will be described below. To achieve that, the shock absorbers 7 and 10 are each equipped with an actuator (not illustrated) formed by, for example, a damping force adjustment valve and a solenoid to adjust the damping force characteristic from a hard characteristic (a high characteristic) to a soft characteristic (a low characteristic) continuously (or in a multi-step manner). The damping force characteristics of the shock absorbers 7 and 10 are variably adjusted according to an instruction electric current (a control signal) supplied from the controller 21 to the actuator.

A conventionally known structure, such as a pressure control method that controls a pilot pressure of a damping force generation valve and a flow rate control method that controls a passage area, can be used as the damping force adjustment valve. Further, each of the shock absorbers 7 and 10 is not limited to the above-described example as long as it can adjust the damping force continuously (or in a multi-step manner), and may be a force generation mechanism such as a pneumatic damper, an electromagnetic damper, an electrorheological fluid damper (an ER damper), and a magnetic fluid damper. Alternatively, each of the shock absorbers 7 and 10 may be a force generation mechanism such as an air damper (an air suspension) using an air spring (a pneumatic spring), a hydraulic damper with front, rear, left, and right hydraulic cylinders connected via pipes, and a stabilizer that provides a force to a motion of the left or right wheel.

Further alternatively, each of the shock absorbers 7 and 10 may be a force generation mechanism capable of generating a thrust force, i.e., a full-active damper formed by a hydraulic actuator, an electric actuator, or an atmospheric pressure actuator, hi other words, a full-active suspension system using a full-active damper may be mounted on the vehicle 1. In sum, each of the shock absorbers 7 and 10 is the force generation mechanism capable of adjusting the force generated between the vehicle body 2 side and the wheel 3 and 4 side of the vehicle 1, and can be realized by employing various kinds of force generation mechanisms such as the damping force variable hydraulic damper, the electrorheological fluid damper, the pneumatic damper, the electromagnetic damper, the hydraulic actuator, the electric actuator, and the atmospheric pressure actuator.

Next, various kinds of sensors 11, 12A, 12B, 12C, 13A, and 13B that detect the state of the vehicle 1 will be described.

As illustrated in FIG. 1, the vehicle 1 includes a vehicle speed sensor 11, sprung acceleration sensors 12A, 12B, and 12C, and unsprung acceleration sensors 13A and 13B. In the embodiment, the three sprung acceleration sensors 12A, 12B, and 12C are disposed on the vehicle body 2 side, and the two unsprung acceleration sensors 13A and 13B are disposed on the front wheel 3 side.

The vehicle speed sensor 11 is disposed on, for example, an output shaft (not illustrated) of a transmission mounted on the vehicle 1. The vehicle speed sensor 11 detects a vehicle speed (a vehicle body speed), which is the speed of the vehicle 1 (the vehicle body 2). Detection information of the vehicle speed sensor 11 (a signal corresponding to the vehicle speed) is output to the controller 21, which will be described below, via a communication line such as in-vehicle LAN communication, for example. The vehicle speed can also be calculated based on detection information (signals corresponding to wheel speeds) of wheel speed sensors (not illustrated) that detect the rotational speeds of the wheels 3 and 4.

The sprung acceleration sensors 12A, 12B, and 12C are disposed on, for example, the vehicle body 2 located on a sprung side of the vehicle 1. In the embodiment, the sprung acceleration sensors 12A, 128, and 12C are disposed at a position corresponding to the left front wheel 3, a position corresponding to the right front wheel 3, and a position corresponding to any one of the left and right rear wheels 4 (for example, the right rear wheel 4), respectively. The sprung acceleration sensors 12A, 12B, and 12C detect vertical accelerations of the vehicle 1 (the vehicle body 2) at the respective positions. In other words, the left front sprung acceleration sensor 12A disposed on the left front wheel 3 side detects a vertical acceleration on the left front side of the vehicle body 2 (a left front sprung acceleration).

The right front sprung acceleration sensor 12B disposed on the right front wheel 3 side detects a vertical acceleration on the right front side of the vehicle body 2 (a right front sprung acceleration). The right rear sprung acceleration sensor 12C disposed on the right rear wheel 4 side detects a vertical acceleration on the right rear side of the vehicle body 2 (a right rear sprung acceleration). Detection information of the sprung acceleration sensors 12A, 128, and 12C (signals corresponding to the vertical accelerations) is output to the controller 21, which will be described below, via the communication line such as the in-vehicle LAN communication. A vertical acceleration on the left rear side of the vehicle body 2 is estimated by the controller 21 using the vertical accelerations of the three sprung acceleration sensors 12A, 129, and 12C.

The unsprung acceleration sensors 13A and 13B are disposed on, for example, the wheel 3 side located on an unsprung side of the vehicle 1. In the embodiment, the unsprung acceleration sensors 13A and 13B are disposed on the left front wheel 3 side and the right front wheel 3 side, respectively. The unsprung acceleration sensors 13A and 13B detect vertical accelerations of the front wheels 3 and 3 located on the unsprung side at the respective positions. In other words, the left front unsprung acceleration sensor 13A disposed on the left front wheel 3 side detects an unsprung vertical acceleration on the left front wheel 3 side (a left front unsprung acceleration).

The right front unsprung acceleration sensor 13B disposed on the right front wheel 3 side detects an unsprung vertical acceleration on the right front wheel 3 side (a right front unsprung acceleration). Detection information of the unsprung acceleration sensors 13A and 138 (signals corresponding to the vertical accelerations) is output to the controller 21, which will be described below, via the communication line such as the in-vehicle LAN communication. As will be described below, an unsprung vertical acceleration on the left rear wheel side and an unsprung vertical acceleration on the right rear wheel 4 side are estimated by the controller 21 using the vertical accelerations of the unsprung acceleration sensors 13A and 13B on the two front wheel 3 and 3 side and a movement distance (a delay distance).

Then, the sprung acceleration sensors 12A, 12B, and 12C and the unsprung acceleration sensors 13A and 13B form a part of a vehicle behavior detection portion that detects the behavior of the vehicle. The vehicle behavior detection portion may be formed by, for example, a vehicle height sensor, a stroke sensor, a displacement sensor, a preview sensor, or the like without being limited to the acceleration sensor. The vehicle height sensor is, for example, a sensor that detects a displacement amount of a suspension arm corresponding to the vehicle height of the vehicle. The stroke sensor and the displacement sensor are, for example, sensors that detect a stroke amount of the shock absorber 7 or 10 (an extension amount and a compression amount). The preview sensor is, for example, an external world perception sensor that perceives a state surrounding the vehicle 1 (for example, a state of a road surface).

The external world perception sensor measures the position of an object existing around the vehicle 1 (for example, a vertical displacement of the road surface). The external world perception sensor can be realized using a camera such as a stereo camera and a single camera (for example, a digital camera), and/or a radar such as a laser radar, an infrared radar, and a millimeter-wave radar (for example, a light emitting element such as a semiconductor radar and a light receiving element that receives it), lidar (LiDAR), or a sonar. The external world perception sensor is not limited to the camera, the radar, the lidar, and the sonar, and can be realized using various kinds of sensors (a detection device, a measurement device, and a radio wave detector) capable of perceiving (detecting) a state of the external world located around the vehicle 1. The external world perception sensor can be disposed at, for example, a position corresponding to the upper side of a windshield of the vehicle 1, a bumper on the front side of the vehicle, or the like.

Next, the controller 21, which controls the shock absorbers 7 and 10, will be described.

The controller 21 is a control apparatus that includes a microcomputer, a power source circuit, and a driving circuit, and is also called an ECU (Electronic Control Unit). The controller 21 is a control apparatus for the suspension system, i.e., a suspension ECU (a shock absorber ECU). The controller 21 controls the shock absorbers 7 and 10 (adjusts the damping forces thereof) based on sensor information detected by, for example, the sensors 11, 12A, 128, 12C, 13A, 13B, and the like.

To fulfill this function, the input side of the controller 21 is connected to the sensors 11, 12A, 12B, 12C, 13A, and 13B. The signal corresponding to the vehicle speed detected by the vehicle speed sensor 11, the signals corresponding to the sprung vertical accelerations detected by the sprung acceleration sensors 12A, 12B, and 12C, and the signals corresponding to the unsprung vertical accelerations detected by the unsprung acceleration sensors 13A and 13B are input to the controller 21. On the other hand, the output side of the controller 21 is connected to the shock absorbers 7 and 10, which are control dampers. The controller 21 outputs the control signal (the instruction electric current) to the actuator of each of the shock absorbers 7 and 10 (for example, the solenoid that adjusts the valve-opening pressure of the damping force adjustment valve).

The controller 21 includes a control portion 21A (refer to FIG. 1), which performs arithmetic, processing, such as a CPU (an arithmetic processing unit), and a storage portion 21B (refer to FIG. 1), which is formed by a memory such as a ROM, a RAM, and a nonvolatile memory. The storage portion 21B stores therein a processing program for calculating (estimating) a vehicle state (a vehicle motion and a vehicle behavior) based on the information (the input signal) of each of the sensors 11, 12A, 12B, 12C, 13A, and 138.

More specifically, the storage portion 218 stores therein a processing program for calculating (estimating) a sprung speed and a relative speed (a stroke speed) at the position of each of the shock absorbers 7 and 10 based on the information (the input signal) of each of the sensors 11, 12A, 128, 12C, 13A, and 1313. Further, the storage portion 21B also stores therein a processing program for calculating the damping force that should be generated by each of the shock absorbers 7 and 10 based on the sprung speed and the relative speed (the stroke speed) at the position of each of the shock absorbers 7 and 10, a processing program for outputting the control signal corresponding to the damping force that should be generated, and the like.

For example, the skyhook control law, the BLQ control law (the bilinear optimal control law), or the H∞ control law can be used as a control law that calculates the damping forces of the shock absorbers 7 and 10 (a control law for ride comfort or a control law for steering stability). The controller 21, for example, increases the damping forces of the shock absorbers 7 and 10 when decelerating the motion (the behavior) of the vehicle body 2 located on the sprung side with the aid of the damping forces of the shock absorbers and 10, and suppresses the damping forces of the shock absorbers 7 and 10 when accelerating the motion (the behavior) of the vehicle body 2 located on the sprung side with the aid of the damping threes of the shock absorbers 7 and 10. The shock absorbers 7 and 10, which are damping force variable dampers, work to change the damping forces to appropriately damp the vertical motion of each of the wheels 3 and 4, thereby suppressing a vibration of the vehicle body 2.

Then, the above-described patent literature, PTL 1 discloses an active suspension control apparatus that stores a road surface displacement amount as control information at a thinning-out rate according to a vehicle speed, thereby being able to perform preview control without requiring a wasteful memory capacity. In other words, the active suspension control apparatus in PTL 1 can reduce considerable memory consumption even at the time of a low speed by thinning out sampled data according to the vehicle speed. However, in the ease of this technique, processing for changing the thinning-out rate according to the vehicle speed is necessitated and thus the processing is complicated, and, in addition thereto, a delay time is used for the counting to the output, so that the control may fail to keep up with a change in the vehicle speed.

On the other hand, the above-described patent literature, PTL 2 discloses a preview control method that performs preview control using a memory in which a storage area of control information is divided according to a vehicle speed range. In this preview control, a sampling period is set for each region in such a manner that a data sampling period of a road surface displacement amount stored in a divided region corresponding to a range of a high vehicle speed is shorter than a data sampling period of a road surface displacement amount stored in a divided region corresponding to a range of a low vehicle speed. Further, each divided region is configured in such a manner that the number of pieces of data stored (saved) in the divided region corresponding to the range of a high vehicle speed is larger than the number of pieces of data stored in the divided region corresponding to the range of a low vehicle speed. As a result, the road surface displacement amount is recorded evenly with respect to all vehicle speeds.

Further, the above-described patent literature, PTL 3 discloses a suspension control apparatus that controls a suspension of a control, target wheel located in back of a detection target portion of a sensor based on a value detected by the sensor provided on a vehicle. This suspension control apparatus includes a gain determiner that reduces a gain used to control the suspension when a previewable time, which is dependent on a longitudinal distance between the detection target portion of the sensor and the control target wheel and a running speed of the vehicle, is shorter than a first setting time dependent on a control delay time, compared to when the previewable time is equal to or longer than the first setting time.

Further, the above-described patent literature, PTL 4 discloses an actuation control apparatus that, based on a preview position indicating a road surface position targeted for detection when a sensor distance is detected by a preview sensor, calculates a data storage position for storing a road surface displacement amount at this preview position. This actuation control apparatus records the road surface displacement amount into a storage position in a storage area of a storage device that is indicated by the calculated data storage position.

However, according to these conventional techniques, the accuracy of the estimated value may be deteriorated and the ride comfort may be reduced when the vehicle runs at a low speed. More specifically, to determine an estimated value for the control of the suspension on the rear wheel, estimating the estimated value based on the situation of the front wheel and the delay time may lead to an increase in the data amount in the memory when the vehicle runs at a low speed.

Then, thinning out the data like the conventional techniques may lead to deterioration of the accuracy of the estimated value and a reduction in the ride comfort.

Further, according to the conventional techniques, when the vehicle speed changes, the control may fail to keep up with it and also end up reducing the ride comfort. More specifically, there have been known techniques that take the delay time into consideration when estimating and controlling the suspension on the rear wheel side. However, when the delay time is calculated based on, for example, the vehicle speed and the wheelbase at the moment that the value (the detection value) of the front wheel unsprung acceleration is input, if the vehicle speed changes by the time the delay time has elapsed, the control may fail to keep up with it and end up reducing the ride comfort.

In light thereof, the embodiment identifies the movement distance based on the vehicle speed for each control period of the controller 21 (for example, 2 ms), thereby allowing the controller 21 to respond well to a change in the vehicle speed. More specifically, in the embodiment, the movement distance is calculated based on the vehicle speed for each control period and the control period, and the unsprung acceleration signal is output at a timing that a total movement distance since the unsprung acceleration sensor inputs the detection value reaches the wheelbase. Due to this configuration, the consumed memory capacity can be kept at a predetermined value determined based on the wheelbase even when the vehicle runs at an extremely low speed. Further, along therewith, the present configuration also allows the control to keep up with a change in the vehicle speed because the movement distance in each period is calculated.

In the following description, the controller 21 according to the embodiment will be described in detail also with reference to FIGS. 2 and 3.

As illustrated in FIG. 2, the controller 21 as a control apparatus (a suspension control apparatus) is connected to each of the sensors 11, 12A, 12B, 12C, 13A, and 13B. The controller 21 controls the shock absorbers 7 and 10, which are the damping force variable dampers, based on the detection signal of each of the sensors 11, 12A, 12B, 12C, 13A, and 13B. In the embodiment, based on the detection values detected by the unsprung acceleration sensors 13A and 13H of the front wheels 3 and 3 provided on the vehicle 1, the controller 21 controls the shock absorbers 10 and 10 of control target wheels (the rear wheels 4) located in back of detection target portions (the front wheels 3 and 3) of these unsprung acceleration sensors 13A and 13B.

In other words, the controller 21 delays the input signals corresponding to the detection values of the unsprung acceleration sensors 13A and 13B on the front wheel 3 and 3 side, and controls portions (the rear wheel 4 side) different from the positions where these detection values are detected. More specifically, the controller 21 identifies the movement distance (the delay distance) from the detection target portions (the front wheels 3 and 3) and controls the shock absorbers 10 and 10 of the control target wheels (the rear wheels 4) located in back of them based on the detection values of the unsprung acceleration sensors 13A and 13B on the front wheel 3 and 3 side and the vehicle speed for each control period. In other words, the controller 21 identities the movement distance from the detection target portions (the front wheels 3 and 3) based on the vehicle speed for each control period, and controls the shock absorbers 10 and 10 of the control target wheels (the rear wheels 4) located in back of them based on this movement distance and the detection values of the unsprung acceleration sensor 13A and 13B on the front wheel 3 and 3 side. In the first embodiment, the controller 21 estimates the suspension behavior on the rear wheel 4 side using the "sprung accelerations" directly acquired from the sprung acceleration sensors 12A, 12B, and 12C and the "unsprung accelerations" on the front wheel 3 and 3 side in which the distance delay is taken into consideration.

To fulfill this function, the controller 21 includes a vehicle state amount calculation portion 22 and a suspension control portion 23. The "vehicle speed" is input from the vehicle speed sensor 11, the "left front sprung acceleration", the "right front sprung acceleration", and the "right rear sprung acceleration" are input from the sprung acceleration sensors 12A, 12B, and 12C, and the "left front unsprung acceleration" and the "right front unsprung acceleration" are input from the unsprung acceleration sensors 13A and 13B to the vehicle state amount calculation portion 22.

The vehicle state amount calculation portion 22 calculates a "left front sprung speed", a "right front sprung speed", a "left rear sprung speed", a "right rear sprung speed", a "left front relative speed", a "right front relative speed", a "left rear relative speed", and a "right rear relative speed" based on the three sprung accelerations (sprung vertical accelerations) and the two unsprung accelerations (unsprung vertical accelerations). The vehicle state amount calculation portion 22 outputs the calculated "left front sprung speed", "right front sprung speed", "left rear sprung speed", "right rear sprung speed", "left front relative speed", "right front relative speed", "left rear relative speed", and "right rear relative speed" to the suspension control portion 23.

Now, the sprung speed is a vertical speed on the sprung side, i.e., a vertical speed at a corresponding position on the vehicle body 2. The "left front sprung speed" is a vertical speed of the vehicle body 2 at a position corresponding to the left front wheel 3, and can be calculated from the "left front sprung acceleration". The "right front sprung speed" is a vertical speed of the vehicle body 2 at a position corresponding to the right front wheel 3, and can be calculated from the "right front sprung acceleration".

The "right rear sprung speed" is a vertical speed of the vehicle body 2 at a position corresponding to the right rear wheel 4, and can be calculated from the "right rear sprung acceleration". The "left rear sprung speed" is a vertical speed of the vehicle body 2 at a position corresponding to the left rear wheel, and can be estimated (calculated) from the "left front sprung acceleration", the "right front sprung acceleration", and the "right rear sprung acceleration", or the "left front sprung speed", the "right front sprung speed", and the "right rear sprung speed".

Further, the relative speed is a vertical relative speed between the sprung side and the unsprung side, i.e., a relative speed between the wheel 3 (4) and the vehicle body 2 at a corresponding position. The "left front relative speed" is a vertical relative speed between the left front side of the vehicle body 2 and the left front wheel 3, and can be calculated from the "left front sprung acceleration" and the "left front unsprung acceleration". The "right front relative speed" is a vertical relative speed between the right front side of the vehicle body 2 and the right front wheel 3, and can be calculated from the "right front sprung acceleration" and the "right front unsprung acceleration".

The "right rear relative speed" is a vertical relative speed between the right rear side of the vehicle body 2 and the right rear wheel 4, and can be estimated (calculated) from the "right rear sprung acceleration" and the "right rear unsprung acceleration". In this case, a value that dates back from the present moment among the "right front unsprung accelerations" detected by the right front unsprung acceleration sensor 13B, more specifically, a value detected at a moment before the right front unsprung acceleration sensor 13B moves by a distance corresponding to the wheelbase is used as the "right rear unsprung acceleration".

The "left rear relative speed" is a vertical relative speed between the left rear side of the vehicle body 2 and the left rear wheel, and can be estimated (calculated) from the "left rear sprung acceleration" and the "left rear unsprung acceleration". In this case, the "left rear sprung acceleration" can be estimated (calculated) from the "left front sprung acceleration", the "right front sprung acceleration", and the "right rear sprung acceleration". A value that dates back from the present moment among the "left front unsprung accelerations" detected by the left front unsprung acceleration sensor 13A, more specifically, a value detected at a moment before the left front unsprung acceleration sensor 13A moves by a distance corresponding to the wheelbase is used as the "left rear unsprung acceleration".

FIG. 2 illustrates the control on the right side of the vehicle 1, i.e., the control of the shock absorber 7 on the right front side and the shock absorber 10 on the right rear side. More specifically, FIG. 2 illustrates the control when the "right front sprung speed", the "right rear sprung speed", the "right front relative speed", and the "right rear relative speed" are calculated based on the "right front sprung acceleration" detected by the right front sprung acceleration sensor 12B, the "right rear sprung acceleration" detected by the right rear sprung acceleration sensor 12C, and the "right front unsprung acceleration" detected by the right front unsprung acceleration sensor 13B. The control on the left side of the vehicle 1, i.e., the control of the shock absorber 7 on the left front side and the shock absorber 10 on the left rear side is similar to the control on the right side except for a difference that the left rear sprung acceleration is not a detected value but is an estimated value. Therefore, in the following description, the control on the shock absorbers 7 and 10 on the right side of the vehicle 1 will be mainly described.

As illustrated in FIG. 2, the vehicle state amount calculation portion 22 includes a first integration portion 22A, a first subtraction portion 22B, a second integration portion 22C, a distance calculation portion 22D, a distance delay output processing portion 22E, a second subtraction portion 22F, and a third integration portion 22G. The "right front sprung acceleration" detected by the right front sprung acceleration sensor 12B and the "right rear sprung acceleration" detected by the right rear sprung acceleration sensor 12C are input to the first integration portion 22A. Further, the "right front sprung acceleration" detected by the right front sprung acceleration sensor 12B is input to the first subtraction portion 22B, and the "right rear sprung acceleration" detected by the right rear sprung acceleration sensor 12C is input to the second subtraction portion 22F. The "right front unsprung acceleration" detected by the right front unsprung acceleration sensor 13B is input to the first subtraction portion 22B and the distance delay output processing portion 22E. The "vehicle speed" detected by the vehicle speed sensor 11 is input to the distance calculation portion 22D.

The "right front sprung acceleration" detected by the right front sprung acceleration sensor 12B and the "right rear sprung acceleration" detected by the right rear sprung acceleration sensor 12C are input to the first integration portion 22A. The first integration portion 22A calculates the "right front sprung speed" by integrating the "right front sprung acceleration" detected by the right front sprung acceleration sensor 12B. Further, the first integration portion 22A calculates the "right rear sprung speed" by integrating the "right rear sprung acceleration" detected by the right rear sprung acceleration sensor 12C. The first integration portion 22A outputs the calculated "right front sprung speed" and "right rear sprung speed" to the suspension control portion 23.

The "right front sprung acceleration" detected by the right front sprung acceleration sensor 12B and the "right front unsprung acceleration" detected by the right front unsprung acceleration sensor 13B are input to the first subtraction portion 22B. The first subtraction portion 22B calculates the "right front relative acceleration" by subtracting the "right front unsprung acceleration" detected by the right front unsprung acceleration sensor 13B from the "right front sprung acceleration" detected by the right front sprung acceleration sensor 12B. The first subtraction portion 22B outputs the calculated "right front relative acceleration" to the second integration portion 22C.

The "right front relative acceleration" calculated by the first subtraction portion 22B is input to the second integration portion 22C. The second integration portion 22C calculates the "right front relative speed" by integrating the "right front relative acceleration" calculated by the first subtraction portion 22B. The second integration portion 22C outputs the calculated "right front relative speed" to the suspension control portion 23.

The "vehicle speed" detected by the vehicle speed sensor 11 is input to the distance calculation portion 22D. The distance calculation portion 22D calculates the movement distance of the vehicle 1 by multiplying the vehicle speed and the time (the control period of the controller 21). The distance calculation portion 22D outputs the calculated movement distance to the distance delay output processing portion 22E.

The movement distance calculated by the distance calculation portion 22D is input to the distance delay output processing portion 22E. In other words, the movement distance of the vehicle 1 is input to the distance delay output processing portion 22E per control period. Further, the "right front unsprung acceleration" detected by the right front unsprung acceleration sensor 13B is input to the distance delay output processing portion 22E. In other words, the "right front unsprung acceleration" is input to the distance delay output processing portion 22E per control period (sampling period). The distance delay output processing portion 22E records (stores) the "right front unsprung acceleration" corresponding to the movement distance per control period. The distance delay output processing portion 22E outputs the "right front unsprung acceleration" as the "right rear unsprung acceleration" at a timing determined in consideration of the delay according to the movement distance. In other words, the distance delay output processing portion 22E performs output timing control of outputting the "right front unsprung acceleration" as the "right rear unsprung acceleration" at the timing determined in consideration of the distance delay (delay distance control).

In this regard, the distance delay output processing portion 22E includes a table indicated as the following table 1. This table is stored in the storage portion 21B (the memory) of the controller 21. The "right front unsprung acceleration" is stored (recorded) in the table for each index corresponding to the movement distance (the delay distance). In the table indicated as the table 1, the wheelbase of the vehicle 1 is assumed to be 2.6 m and the step size is set to 5 cm.

TABLE 1

| Index (Delay Distance) | Unsprung Acceleration |
| --- | --- |
| 1 (0 cm) | a1 |
| 2 (5 cm) | a2 |
| 3 (10 cm) | a3 |
| 4 (15 cm) | a4 |
| . | . |
| . | . |
| . | . |
| 52 (255 cm) | a52 |
| 53 (260 cm) | a53 |

The distance delay output processing portion 22E acquires the right front unsprung acceleration from the right front unsprung acceleration sensor 13B and stores it into the internal memory (the storage portion 21B of the controller 21). In the next control period (at a sampling timing), the distance delay output processing portion 22E acquires a new right front unsprung acceleration, and, along therewith, shifts the table of the right front unsprung acceleration input in advance by an amount corresponding to the movement distance based on the movement distance calculated from the present vehicle speed and the control period. Then, the distance delay output processing portion 22E outputs the value of aright front unsprung acceleration at which the total movement distance reaches the wheelbase after the shift as the right rear unsprung acceleration. In other words, the distance delay output processing portion 22E outputs the right front unsprung acceleration with the output timing thereof adjusted (controlled) based on the movement distance to the second subtraction portion 22F as the right rear unsprung acceleration.

In this manner, the distance delay output processing portion 22E associates the index in the table with the delay distance, and processes the table so as to increment the index in the table by one when the vehicle advances by a predetermined distance. In the above-described table indicated as the table 1, the wheelbase of the vehicle 1 is assumed to be 2.6 m and the step size is set to 5 cm, and the index shifts by one each time the vehicle moves by 5 cm. Employing such a configuration allows the controller 21 to save the internally held data amount (the total memory amount). Further, the control performance can be improved by reducing the step size. The step size can be set according to the required performance and the memory amount (the storage capacity).

FIG. 3 illustrates processing for reducing an error due to a movement distance equal to or shorter than the step size. In this FIG. 3, the distance delay output processing portion 22E includes a division portion 22E1 and an addition portion 22E2. The division portion 22E1 divides the movement distance by the step size. The division portion 22E1 outputs a quotient resulting from the division as the index. Further, the division portion 22E1 outputs a remainder resulting from the division to the addition portion 22E2. The addition portion 22E2 adds the movement distance calculated by the distance calculation portion 22D and the remainder resulting from the division that is output from the division portion 22E1. The present processing allows an error to be reduced by adding a movement distance equal to or shorter than the step size to a movement distance at the next time and converting it into the index in this manner.

The "right rear sprung acceleration" detected by the right rear sprung acceleration sensor 12C and the "right rear unsprung acceleration" output from the distance delay output processing portion 22E are input to the second subtraction portion 22F. The second subtraction portion 22F calculates the "right rear relative acceleration" by subtracting the "right rear unsprung acceleration" estimated by the distance delay output processing portion 22E from the "right rear sprung acceleration" detected by the right rear sprung acceleration sensor 12C. The second subtraction portion 22F outputs the calculated "right rear relative acceleration" to the third integration portion 22G.

The "right rear relative acceleration" calculated by the second subtraction portion 22F is input to the third integration portion 22G. The third integration portion 22G calculates the "right rear relative speed" by integrating the "right rear relative acceleration" calculated by the second subtraction portion 22F. The third integration portion 22G outputs the calculated "right rear relative speed" to the suspension control portion 23.

The "left front sprung speed", the "right front sprung speed", the "left rear sprung speed", the "right rear sprung speed", the "left front relative speed", the "right front relative speed", the "left rear relative speed", and the "right rear relative speed" are input from the vehicle state amount calculation portion 22 to the suspension control portion 23. FIG. 2 illustrates the control on the right side of the vehicle 1. Therefore, in FIG. 2, the "right front sprung speed", the "right rear sprung speed", the "right front relative speed", and the "right rear relative speed" are input from the vehicle state amount calculation portion 22 to the suspension control portion 23.

The suspension control portion 23 calculates the damping forces that should be generated by the shock absorbers 7 and 10 according to these inputs. For example, the suspension control portion 23 calculates the damping forces that should be generated by the shock absorbers 7 and 10 based on a control law such as the skyhook control law. Then, the suspension control portion 23 outputs the control signals (the instruction electric currents) according to the damping forces that should be generated by the shock absorbers 7 and 10 to the shock absorbers 7 and 10, which are the control dampers. In other words, the suspension control portion 23 outputs the instruction electric currents (the control signals) corresponding to damper instruction values to the actuators of the shock absorbers 7 and 10 (for example, the solenoids that adjust the valve-opening pressures of the damping force adjustment valves).

The control apparatus according to the first embodiment is configured in the above-described manner, and, next, an operation thereof will be described.

When the behavior (the state) of the vehicle 1 changes as, for example, the vehicle 1 runs, this change in the behavior is detected by the vehicle speed sensor 11, the three sprung acceleration sensors 12A, 12B, and 12C, and the two unsprung acceleration sensors 13A and 13B mounted on the vehicle 1, and is input to the controller 21, which controls the shock absorbers 7 and 10. The controller 21 outputs the control signals (the instruction electric currents) for controlling the damping forces of the shock absorbers 7 and 10 to the shock absorbers 7 and 10 based on the detection value (the detection signal) of each of the sensors 11, 12A, 12B, 12C, 13A, and 13B.

At this time, in the first embodiment, the controller 21 identifies the movement distance from the front wheels 3 and 3, which are the detection target portions of the unsprung acceleration sensors 13A and 13B, and controls the shock absorbers 10 and 10 on the rear wheel 4 side located in back of them based on the detection values of the unsprung acceleration sensors 13A and 13B on the front wheel 3 and 3 side and the vehicle speed for each control period of the controller 21. Therefore, the controller 21 can control the shock absorbers 10 and 10 on the rear wheel 4 side based on the "unsprung accelerations on the rear wheel 4 side" estimated from the "movement distance from the front wheels 3 and 3" and the "detection values of the unsprung acceleration sensors 13A and 13B on the front wheel 3 and 3 side". In other words, the controller 21 can control the shock absorbers 10 and 10 on the rear wheel 4 side using values that date back from the present moment among the "right front unsprung accelerations" detected by the unsprung acceleration sensors 13A and 13B on the front wheel 3 and 3 side, more specifically, values detected at a moment before the unsprung acceleration sensors 13A and 13B on the front wheel 3 and 3 side move by the distance corresponding to the wheelbase.

Therefore, the present configuration can keep the memory amount constant due to the movement distance (for example, the wheelbase and the step size) without depending on the vehicle speed. Due to that, the present configuration contributes to avoiding considerable memory consumption at the time of an extremely low speed and also facilitates estimating the memory consumption amount at a design stage. Further, the present configuration makes it easy to keep up with a change in the vehicle speed by identifying the movement distance per control period. Due to that, the present configuration can allow the output timing to be accurately controlled and prevent the performance from being deteriorated due to the missed timing. As a result, the present configuration can ensure the accuracy of the estimated value (for example, the value output from the distance delay output processing portion 22E) and the followability of the control, thereby improving the ride comfort.

Figure 4:
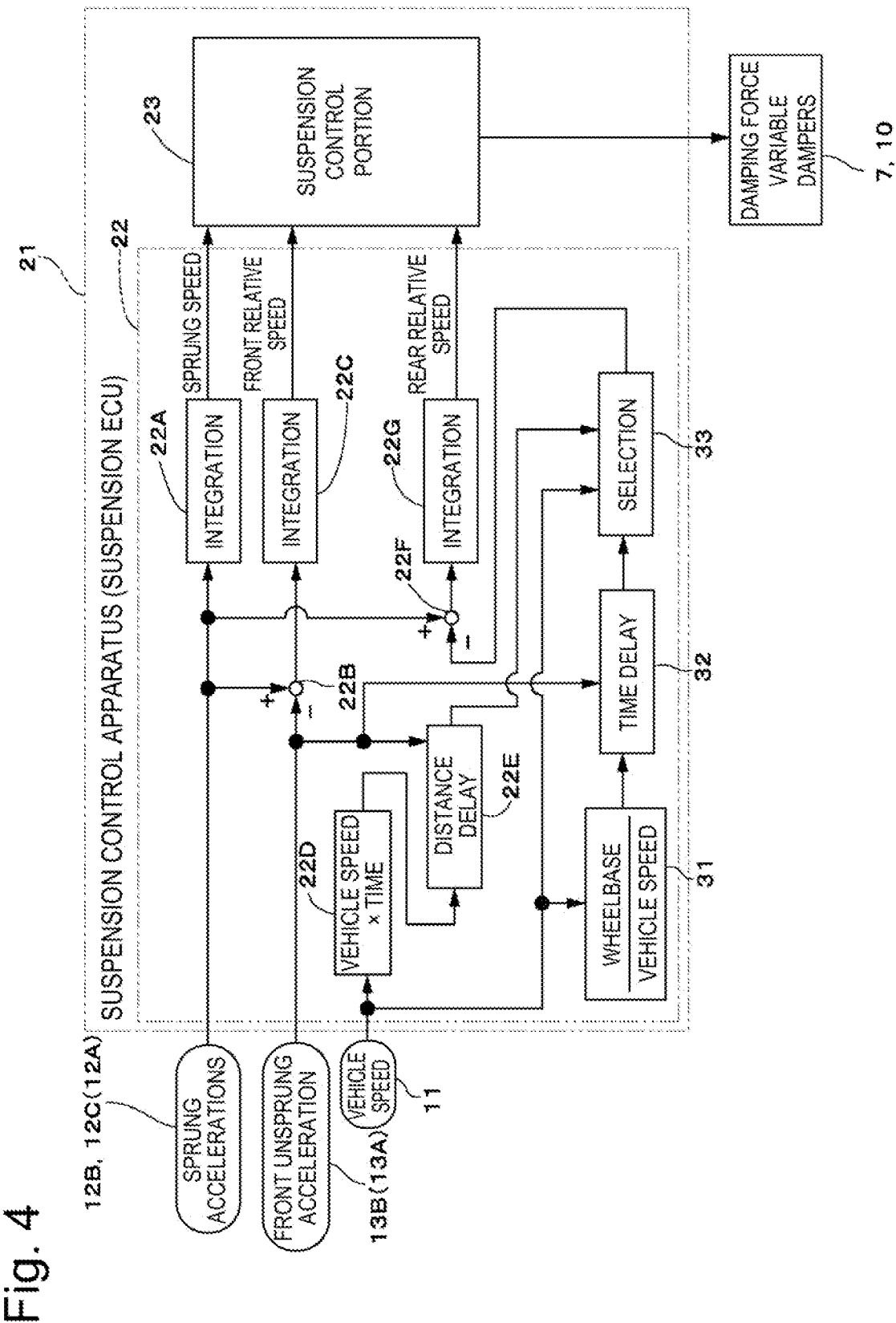
FIG. 4 is a block diagram illustrating a control apparatus and the like according to a second embodiment.

Next, FIG. 4 illustrates a second embodiment. The second embodiment is characterized by being configured to switch the delay distance control and the delay time control according to the vehicle speed. The second embodiment will be described, indicating similar components to the above-described first embodiment by the same reference numerals and omitting descriptions thereof.

In the second embodiment, the control according to the first embodiment (the delay distance control) and the conventional control (the delay time control) are combined. In the above-described first embodiment, a point unable to be sampled is undesirably generated if the vehicle speed increases and the index shifts by two or more during one sampling period. In light thereof, in the second embodiment, when the vehicle runs at such a speed that the index shifts by two or more, the control is switched to the delay time control and the suspension behavior on the rear wheel 4 side is estimated by the delay time control. When the vehicle runs at such a speed that the index shifts by two or more, the delay time does not increase and the rate of a change in the vehicle speed also reduces, and therefore the problem with the delay time control is less likely to be actualized and the delay time control effectively works. Such a vehicle speed that the index shifts by two or more, i.e., a speed at which the delay distance control and the delay time control are switched (a switching speed) is, for example, 90 kilometers per hour assuming that the control period (the sampling period) is 2 ms and the step size is 5 cm.

In this manner, the delay distance control and the delay time control are switched according to the vehicle speed in the second embodiment. To fulfill this function, the vehicle state amount calculation portion 22 includes a delay time calculation portion 31, a time delay output processing portion 32, and a selection portion 33 in addition to the first integration portion 22A, the first subtraction portion 22B, the second integration portion 22C, the distance calculation portion 22D, the distance delay output processing portion 22E, the second subtraction portion 22F, and the third integration portion 22G. The "right front unsprung acceleration" detected by the right front unsprung acceleration sensor 13B is input to the first subtraction portion 22B, the distance delay output processing portion 22E, and the time delay output processing portion 32. The "vehicle speed" detected by the vehicle speed sensor 11 is input to the distance calculation portion 22D and the delay time calculation portion 31.

The "vehicle speed" detected by the vehicle speed sensor 11 is input to the delay time calculation portion 31. The delay time calculation portion 31 calculates a time taken for the right front unsprung acceleration sensor 13B to move by the distance corresponding to the wheelbase, i.e., the delay time by dividing the wheelbase of the vehicle 1 (i.e., an axle-to-axle distance between the front wheel 3 and the rear wheel 4) by the vehicle speed. The delay time calculation portion 31 outputs the calculated delay time to the time delay output processing portion 32.

The delay time calculated by the delay time calculation portion 31 is input to the time delay output processing portion 32. In other words, the delay time, i.e., the time taken for the right front unsprung acceleration sensor 13B to move by the distance corresponding to the wheelbase is input to the time delay output processing portion 32 per control period (sampling period). Further, the "right front unsprung acceleration" detected by the right front unsprung acceleration sensor 13B is input to the time delay output processing portion 32. In other words, the "right front unsprung acceleration" is input to the time delay output processing portion 32 per control period (sampling period).

The time delay output processing portion 32 records (stores) the "right front unsprung acceleration" and the delay time per control period. The time delay output processing portion 32 outputs the "right front unsprung acceleration" as the "right rear unsprung acceleration" at a timing determined in consideration of the delay time. In other words, the time delay output processing portion 32 performs output timing control of outputting the "right front unsprung acceleration" as the "right rear unsprung acceleration" at the timing determined in consideration of the time delay (the delay time control).

Now, the time delay output processing portion 32 includes a table indicated as the following table 2. This table is stored in the storage portion 21B (the memory) of the controller 21. The "right front unsprung acceleration" is stored (recorded) in the table together with the delay time for each index (for each control period). This storage can be carried out, for example, when the vehicle speed is S kilometers per hour or higher (preferably, 10 kilometers per hour or higher). Further, to further reduce the memory consumption, the present embodiment can also be configured in such a manner that this storage is carried out when the vehicle runs at a speed close to the speed for the switching between the delay distance control and the delay time control, such as when the vehicle runs at a speed equal to or higher than ½ or ⅔ of the switching speed.

TABLE 2

| Index | Unsprung Acceleration | Delay Time |
|---|---|---|
| 1 | a1 | t1 |
| 2 | a2 | t2 |
| 3 | a3 | t3 |

TABLE 2-continued

| Index | Unsprung Acceleration | Delay Time |
|---|---|---|
| 4 | a4 | t4 |
| . | . | . |
| . | . | . |
| . | . | . |
| n-1 | an-1 | tn-1 |
| n | an | tn |

The time delay output processing portion 32 acquires the right front unsprung acceleration from the right front unsprung acceleration sensor 13B and stores it into the internal memory (the storage portion 21B of the controller 21). The time delay output processing portion 32 outputs the value of the right front unsprung acceleration as the right rear unsprung acceleration when the delay time has elapsed. In other words, the time delay output processing portion 32 outputs the right front unsprung acceleration with the output timing thereof adjusted (controlled) based on the delay time to the selection portion 33 as the right rear unsprung acceleration.

The "right rear unsprung acceleration" is input from the time delay output processing portion 32 to the selection portion 33. Further, the "right rear unsprung acceleration" is input from the distance delay output processing portion 22E to the selection portion 33. Further, the "vehicle speed" detected by the vehicle speed sensor 11 is input to the selection portion 33. The selection portion 33 selects whether to output the "right rear unsprung acceleration" input from the time delay output processing portion 32 or output the "right rear unsprung acceleration" input from the distance delay output processing portion 22E according to the vehicle speed. The selection portion 33 outputs the "right rear unsprung acceleration" input from the distance delay output processing portion 22E to the second subtraction portion 22F when the input "vehicle speed" is lower than the switching speed at which the delay distance control and the delay time control are switched (for example, 90 kilometers per hour). The selection portion 33 outputs the "right rear unsprung acceleration" input from the time delay output processing portion 32 to the second subtraction portion 22F when the input "vehicle speed" is equal to or higher than the switching speed.

The second embodiment is configured to switch the delay distance control and the delay time control according to the vehicle speed as described above, and the basic operation thereof is not significantly different from the operation according to the above-described first embodiment. Especially, in the second embodiment, the delay distance control can be performed when the vehicle runs at a low speed, and the delay time control can be performed when the vehicle runs at a high speed. Therefore, the shock absorbers 7 and 10 can be controlled using the accurate estimated value (the state amount in back of the detection target portion) regardless of the vehicle speed (regardless of whether the vehicle speed is high or low).

Figure 5:
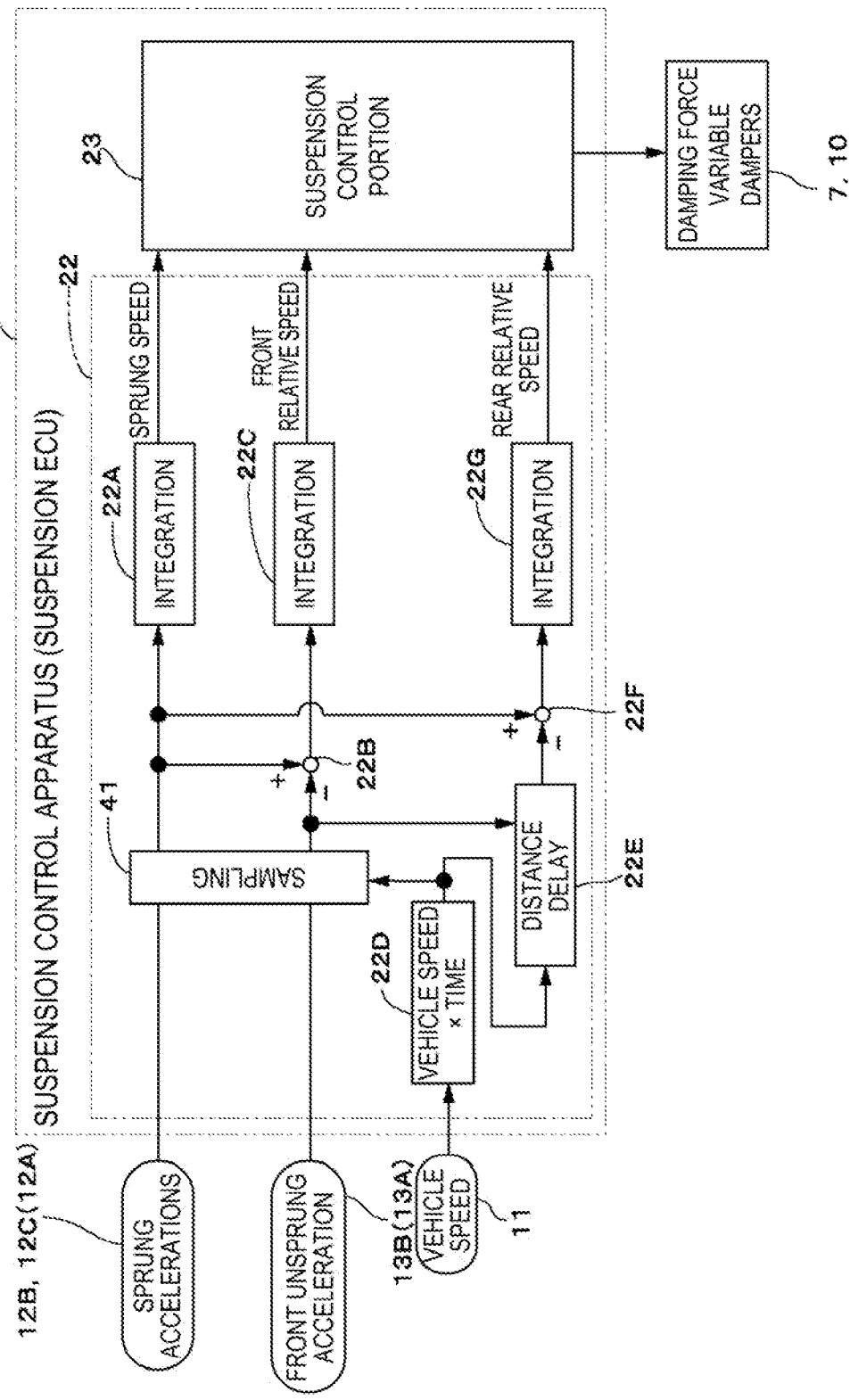
FIG. 5 is a block diagram illustrating a control apparatus and the like according to a third embodiment.

Next, FIG. 5 illustrates a third embodiment. The third embodiment is characterized by being configured to allow the vehicle behavior detection portion to carry out sampling per predetermined movement distance. The third embodiment will be described, indicating similar components to the above-described first embodiment by the same reference numerals and omitting descriptions thereof.

The third embodiment aims to improve the performance when the vehicle runs at such a high speed that the index shifts by two or more (for example, when the vehicle runs at 90 kilometers per hour or higher) similarly to the second embodiment. In the third embodiment, the movement distance is calculated based on the vehicle speed and an internal timer, and the sensor value of the unsprung acceleration is acquired and an index of the internal memory is also shifted by one at a timing when the movement distance reaches a predetermined movement distance. Employing such a configuration allows the sampling to be carried out per predetermined distance constantly and keeps the shift amount of the table constant. As a result, the third embodiment also allows the controller 21 to support even a high vehicle speed similarly to the second embodiment.

In the third embodiment characterized in this manner, the vehicle state amount calculation portion 22 includes a sampling portion 41 in addition to the first integration portion 22A, the first subtraction portion 22B, the second integration portion 22C, the distance calculation portion 22D, the distance delay output processing portion 22E, the second subtraction portion 22F, and the third integration portion 22G. The "right front sprung acceleration" detected by the right front sprung acceleration sensor 12B, the "right rear sprung acceleration" detected by the right rear sprung acceleration sensor 12C, and the "right front unsprung acceleration" detected by the right front unsprung acceleration sensor 13B are input to the sampling portion 41. Further, the movement distance is input from the distance calculation portion 22D to the sampling portion 41. The sampling portion 41 outputs the "right front sprung acceleration" detected by the right front sprung acceleration sensor 12B, the "right rear sprung acceleration" detected by the right rear sprung acceleration sensor 12C, and the "right front unsprung acceleration" detected by the right front unsprung acceleration sensor 13B at a timing when the movement distance reaches the predetermined movement distance (for example, 5 cm).

The third embodiment includes the sampling portion 41 as described above, and the basic operation thereof is not significantly different from the operation according to the above-described first embodiment. Especially, in the third embodiment, the sensor value of the unsprung acceleration can be acquired and the index in the internal memory can also be shifted by one at the timing when the movement distance reaches the predetermined movement distance. Therefore, the shock absorbers 7 and 10 can also be accurately controlled even when the vehicle runs at a high speed.

The above-described first embodiment has been described citing the example in which the vehicle behavior detection portion is the unsprung acceleration sensors 13A and 13B. However, the vehicle behavior detection portion is not limited thereto, and, for example, a vehicle height sensor, a stroke sensor, a displacement sensor, or a preview sensor may be used as the vehicle behavior detection portion. The preview sensor is, for example, an external world perception sensor that detects the state of the road surface of the vehicle 1 (the displacement of the road surface). The external world perception sensor can be realized using a camera such as a stereo camera, a single camera and so on (for example, a digital camera), and/or a radar such as a laser radar, an infrared radar, and a millimeter-wave radar (for example, a light emitting element such as a semiconductor radar and a light receiving element that receives it), a lidar (LiDAR), or a sonar. The external world perception sensor (the preview sensor) is not limited to the camera, the radar, the lidar, and the sonar, and can be realized using various kinds of sensors (a detection device, a measurement device, and a radio wave detector) capable of perceiving (detecting) the state of the external world located around the vehicle 1. The external world perception sensor (the preview sensor) can be provided at, for example, a position corresponding to the upper side of the windshield of the vehicle or the bumper on the front side of the vehicle.

In the case where the vehicle behavior detection portion is formed using the preview sensor, the control apparatus (the controller) identifies the movement distance from the detection target portion (for example, the road surface lying ahead) and controls the force generation mechanism (the shock absorber) of the control target wheel (the front wheel and/or the rear wheel) located in back thereof based on the detection value of the preview sensor and the vehicle speed for each control period. In other words, the control apparatus identifies the movement distance from the detection target portion based on the vehicle speed for each control period, and controls the force generation mechanism (the shock absorber) of the control target wheel (the front wheel and/or the rear wheel) located in back thereof based on this movement distance and the detection value of the preview sensor.

In this case, the force generation mechanism can be controlled based on the "behavior amount (the state amount) in back of the detection target portion" estimated from the "movement distance from the detection target portion" and the "detection value of the preview sensor". Examples of the detection target portion include a portion ahead of the vehicle and the bumper on the front side of the vehicle. In other words, the vehicle behavior detection portion can detect, for example, a displacement amount between the road surface lying ahead of the vehicle and the vehicle body (the behavior amount and the state amount), a displacement amount between the road surface directly below the bumper on the front side of the vehicle and the vehicle body (the behavior amount and the state amount), or the like. The same also applies to the second embodiment and the third embodiment.

The first embodiment has been described citing the example in which the sprung acceleration sensors 12A, 12B, and 12C are disposed at the three portions that are the left front side, the right front side, and the right rear side of the vehicle body 2. However, the sprung acceleration sensors are not limited thereto, and may be disposed at, for example, three portions that are the left front side, the right front side, and the left rear side of the vehicle body, or three portions that are the left front side, the left rear side, and the right rear side of the vehicle body. In other words, supposing that the vehicle body is a rigid body, vertical motions at three points on a surface thereof are used to estimate a vertical motion at the remaining single point, and therefore the sprung acceleration sensors can be configured to be disposed at three portions of the vehicle body. The same also applies to the second embodiment and the third embodiment.

The first embodiment has been described citing the example configured in such a manner that the shock absorber 10 on the left rear wheel (not illustrated) side and the shock absorber 10 on the right rear wheel 4 side are controlled based on the detection value of the left front unsprung acceleration sensor 13A on the left front wheel 3 side and the detection value of the right front unsprung acceleration sensor 13B on the right front wheel 3 side. However, the control apparatus is not limited thereto, and, for example, may be configured in such a manner that an unsprung acceleration sensor is provided on one rear wheel side of the left and right rear wheels, and thereby the shock absorber on the one rear side is controlled based on the detection value of the unsprung acceleration sensor on the rear wheel side and the shock absorber on the other rear side is controlled based on the detection value of the unsprung acceleration sensor on the front wheel side (and the movement distance). In other words, the control apparatus can be configured to, based on the detection value detected by at least one vehicle behavior detection portion provided on the vehicle, control the force generation mechanism of the control target wheel located in back of the detection target portion of this vehicle behavior detection portion. The same also applies to the second embodiment and the third embodiment.

Further, each of the embodiments is only an example, and it is apparent that the configurations indicated in the different embodiments can be partially replaced or combined.

Possible configurations as the control apparatus based on the above-described embodiments include the following examples.

As a first configuration, a control apparatus is configured to, based on a detection value detected by at least one vehicle behavior detection portion provided on a vehicle, control a force generation mechanism of a control target wheel located in back of a detection target portion of the vehicle behavior detection portion. The control apparatus identifies a movement distance from the detection target portion and controls the force generation mechanism of the control target wheel located in back of the detection target portion based on the detection value and a vehicle speed for each control period.

According to this first configuration, the force generation mechanism can be controlled based on a "state amount (a behavior amount) at a position in back of the detection target portion" estimated from the "movement distance from the detection target portion" and the "detection value of the vehicle behavior detection portion". Therefore, the present configuration can keep the memory amount constant due to the movement distance without depending on the vehicle speed. Due to that, the present configuration contributes to avoiding considerable memory consumption at the time of an extremely low speed and also facilitates estimating the memory consumption amount at a design stage. Further, the present configuration makes it easy to keep up with a change in the vehicle speed by identifying the movement distance per control period. Due to that, the present configuration can allow the output timing to be accurately controlled and prevent the performance from being deteriorated due to the missed timing. As a result, the present configuration can ensure the accuracy of the estimated value and the followability of the control, thereby improving the ride comfort.

As a second configuration, in the first configuration, the vehicle behavior detection portion is a preview sensor. According to this second configuration, the force generation mechanism can be controlled based on the "state amount (the behavior amount) at the position in back of the detection target portion" estimated from the "movement distance from the detection target portion" and the "detection value of the preview sensor".

According to a third configuration, in the first configuration, the vehicle behavior detection portion is an unsprung acceleration sensor of a front wheel. According to this third configuration, the force generation mechanism can be controlled based on the "state amount (for example, an acceleration) at the position in back of the front wheel" estimated from the "movement distance from the front wheel" and the "detection value of the unsprung acceleration sensor of the front wheel".

According to a fourth configuration, in any of the first configuration to the third configuration, the control apparatus switches delay distance control and delay time control according to the vehicle speed. According to this fourth configuration, the delay distance control can be performed when the vehicle runs at a low speed, and the delay time control can be performed when the vehicle runs at a high speed. Therefore, the force generation mechanism can be controlled using the accurate estimated value (the state amount in back of the detection target portion) regardless of the vehicle speed (regardless of whether the vehicle speed is high or low).

The present invention shall not be limited to the above-described embodiments, and includes various modifications. For example, the above-described embodiments have been described in detail to facilitate a better understanding of the present invention, and the present invention shall not necessarily be limited to a configuration including all of the described features. Further, a part of the configuration of some embodiment can be replaced with the configuration of another embodiment. Further, some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2020-127319 filed on Jul. 28, 2020. The entire disclosure of Japanese Patent Application No. 2020-127319 filed on Jul. 28, 2020 including the specification, the claims, the drawings, and the abstract is incorporated herein by reference in its entirety.

REFERENCE SIGNS LIST 1 vehicle
3 front wheel (detection target portion)
4 rear wheel (control target wheel)
7, 10 shock absorber (force generation mechanism)
13A, 13B unsprung acceleration sensor (vehicle behavior detection portion)
21 controller (control apparatus)

The invention claimed is:

1. A control apparatus configured to, based on a detection value detected by at least one vehicle behavior detection portion provided on a vehicle, control a force generation mechanism of a control target wheel located in back of a detection target portion of the vehicle behavior detection portion by a predetermined length,
wherein the control apparatus is operable to
identify a movement distance from the detection target portion per the control period of the detection value,
store the detection value per distance by dividing the predetermined length by a predetermined step size,
shift the stored detection value by a predetermined distance corresponding to the movement distance,
refer to the detection value in one of positions where the shifted distance corresponds to the predetermined length, and
control the force generation mechanism of the control target wheel located in back of the detection target portion, based on the control period of the control apparatus and a vehicle speed for the control period,
wherein the stored detection value is shifted by the number of regions according to a quotient resulting from dividing the movement distance by the step size, and a remainder of the division is added to the movement distance identified at the time of a next control period in the control period.

2. The control apparatus according to claim 1, wherein the vehicle behavior detection portion is a preview sensor.

3. The control apparatus according to claim 1, wherein the vehicle behavior detection portion is an unsprung acceleration sensor of a front wheel.

4. The control apparatus according to claim 1, wherein the control apparatus switches delay distance control and delay time control according to the vehicle speed.

5. The control apparatus according to claim 2, wherein the control apparatus switches delay distance control and delay time control according to the vehicle speed.

6. The control apparatus according to claim 3, wherein the control apparatus switches delay distance control and delay time control according to the vehicle speed.

* * * * *